United States Patent
Bielby

(10) Patent No.: US 11,588,735 B2
(45) Date of Patent: Feb. 21, 2023

(54) EDGE PROCESSING OF SENSOR DATA USING A NEURAL NETWORK TO REDUCE DATA TRAFFIC ON A COMMUNICATION NETWORK

(71) Applicant: Micron Technology, Inc., Boise, ID (US)

(72) Inventor: Robert Richard Noel Bielby, Placerville, CA (US)

(73) Assignee: Micron Technology, Inc., Boise, ID (US)

(*) Notice: Subject to any disclaimer, the term of this patent is extended or adjusted under 35 U.S.C. 154(b) by 205 days.

(21) Appl. No.: 16/942,317

(22) Filed: Jul. 29, 2020

(65) Prior Publication Data
US 2022/0038375 A1  Feb. 3, 2022

(51) Int. Cl.
| | |
|---|---|
| B60W 40/08 | (2012.01) |
| B60W 50/00 | (2006.01) |
| G05D 1/00 | (2006.01) |
| G06N 3/063 | (2006.01) |
| H04L 47/12 | (2022.01) |
| G06N 3/08 | (2023.01) |
| G06N 3/04 | (2023.01) |
| H04L 67/12 | (2022.01) |

(52) U.S. Cl.
CPC .............. H04L 47/12 (2013.01); G06N 3/04 (2013.01); G06N 3/08 (2013.01); H04L 67/12 (2013.01)

(58) Field of Classification Search
CPC ........... H04L 47/12; H04L 67/12; G06N 3/04; G06N 3/08
See application file for complete search history.

(56) References Cited

U.S. PATENT DOCUMENTS

| | | |
|---|---|---|
| 10,713,754 B1 | 7/2020 | Wang et al. |
| 2017/0083829 A1 | 3/2017 | Kang et al. |
| 2018/0174023 A1* | 6/2018 | Imam ................. G06N 3/08 |

(Continued)

FOREIGN PATENT DOCUMENTS

WO    WO-2016096226 A1 *  6/2016  ........... G08G 1/0108

OTHER PUBLICATIONS

En Li et al., "Edge Intelligence: On-Demand Deep Learning Model Co-Inference with Device-Edge Synergy."The SIGCOMM Workshop on Mobile Edge Communications, Aug. 21-23, 2018, Retrieved from the Internet <https://arxiv.org/abs/1806.07840v4> on Oct. 23, 021.

(Continued)

*Primary Examiner* — Christopher B Robinson
(74) *Attorney, Agent, or Firm* — Greenberg Traurig

(57) ABSTRACT

Methods, systems, and apparatuses related to edge processing of sensor data using a neural network to reduce network traffic to and/or from a server. In one approach, a cloud server processes sensor data from a vehicle using an artificial neural network (ANN). The ANN has several layers. Based on analyzing at least one characteristic of the sensor data received from the vehicle and/or a context associated with processing the sensor data, the cloud server determines to send one or more of the layers of the ANN for edge processing on the vehicle itself. In other cases, the cloud server decides to send the one or more layers to an edge server device located on a communication path between the vehicle and the cloud server. The edge processing reduces network data traffic.

19 Claims, 6 Drawing Sheets

(56) References Cited

U.S. PATENT DOCUMENTS

| | | |
|---|---|---|
| 2018/0322711 A1 | 11/2018 | Weimerskirch |
| 2018/0373988 A1 | 12/2018 | Dhanyamraju et al. |
| 2019/0042884 A1* | 2/2019 | Guim Bernat ...... H04L 67/1097 |
| 2019/0073586 A1* | 3/2019 | Chen ...................... G06N 7/005 |
| 2019/0205744 A1* | 7/2019 | Mondello ............ G06N 3/0481 |
| 2019/0382004 A1* | 12/2019 | Golov ................. B60W 60/001 |
| 2019/0382029 A1* | 12/2019 | Golov .................. G06V 10/764 |
| 2020/0176121 A1* | 6/2020 | Dalal ..................... G16H 20/60 |
| 2022/0036157 A1 | 2/2022 | Kale et al. |

OTHER PUBLICATIONS

International Search Report and Written Opinion, PCT/US2021/042672, dated Nov. 2, 2021.

\* cited by examiner

EDGE PROCESSING OF SENSOR DATA USING A NEURAL NETWORK TO REDUCE DATA TRAFFIC ON A COMMUNICATION NETWORK

FIELD OF THE TECHNOLOGY

At least some embodiments disclosed herein relate to neural network processing devices in general, and more particularly, but not limited to edge processing of sensor data using a neural network to reduce data traffic.

BACKGROUND

Recent developments in the technological area of autonomous driving allow a computing system to operate, at least under some conditions, control elements of a motor vehicle without the assistance from a human operator of the vehicle.

For example, sensors (e.g., cameras and radars) can be installed on a motor vehicle to detect the conditions of the surroundings of the vehicle traveling on a roadway. A computing system installed on the vehicle analyzes the sensor inputs to identify the conditions and generate control signals or commands for the autonomous adjustments of the direction and/or speed of the vehicle, with or without any input from a human operator of the vehicle.

In some arrangements, when a computing system recognizes a situation where the computing system may not be able to continue operating the vehicle in a safe manner, the computing system alerts the human operator of the vehicle and requests the human operator to take over the control of the vehicle and drive manually, instead of allowing the computing system to drive the vehicle autonomously.

Autonomous driving and/or an advanced driver assistance system (ADAS) can use an artificial neural network (ANN) for the identification of events and/or objects that are captured in sensor inputs. Examples of sensor inputs include images from digital cameras, lidars, radars, ultrasound sonars, etc.

In general, an artificial neural network (ANN) uses a network of neurons to process inputs to the network and to generate outputs from the network. For example, each neuron in the network receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions. The relations between the input(s) and the output(s) of an ANN in general are defined by an ANN model that includes the data representing the connectivity of the neurons in the network, as well as the bias, activation function, and synaptic weights of each neuron.

For example, the inputs to an ANN network may be generated based on camera inputs; and the outputs from the ANN network may be the identification of an item, such as an event or an object.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
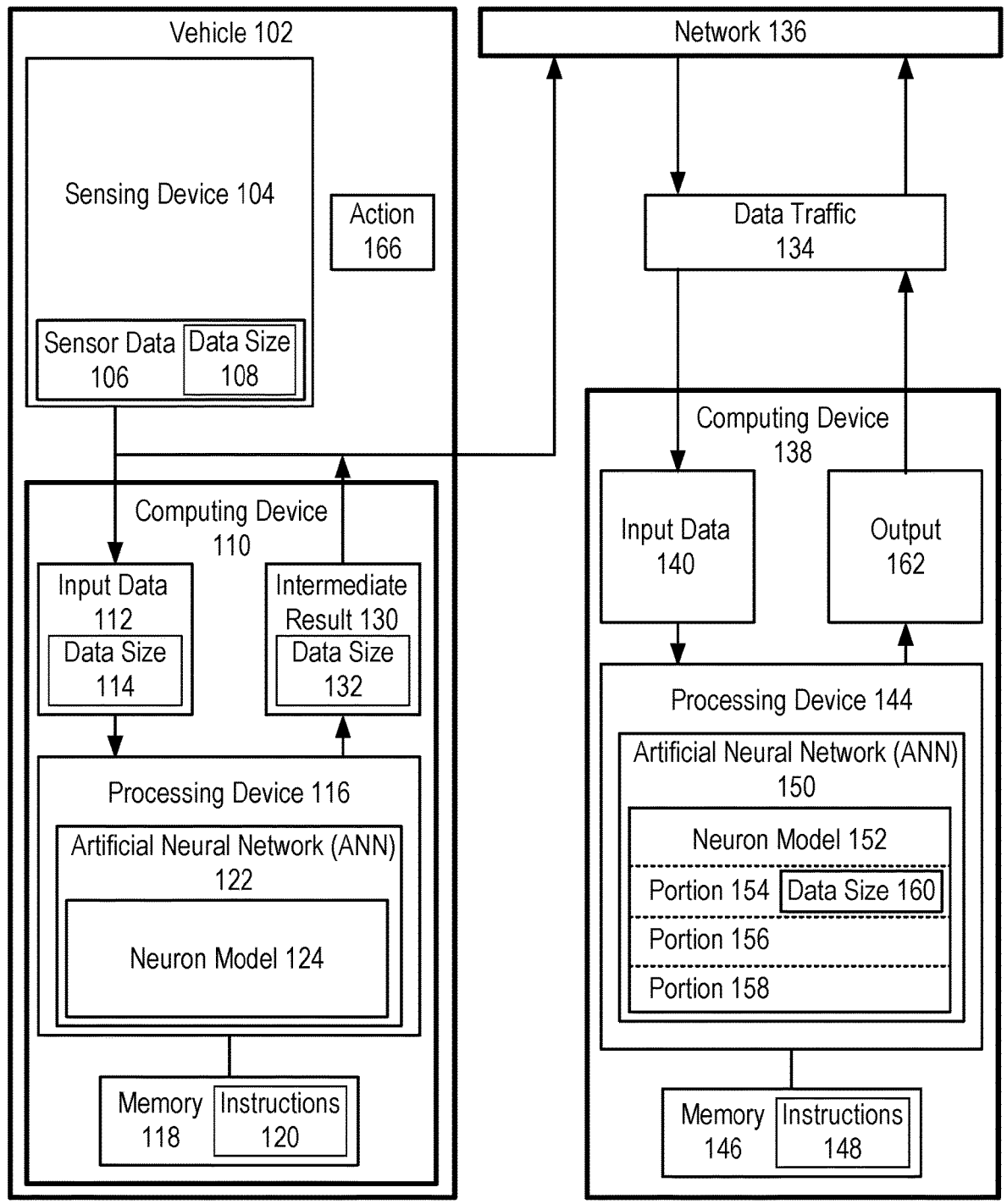
FIG. 1 illustrates a data processing system that uses edge processing to reduce data traffic on a network according to one embodiment.

The following disclosure describes various embodiments for edge processing of sensor data (e.g., processing at a vehicle or edge server) using a portion of a neural network to reduce data traffic to a remote computing device (e.g., cloud server). At least some embodiments herein relate to processing of sensor data using a computing device (e.g., a neural network processor) located in a vehicle. The processing is performed using a portion of an artificial neural network (ANN) received from a remote computing device that performs further processing using other portions of the ANN. In one example, the vehicle is an autonomous vehicle (e.g., car, boat, plane, or drone).

In prior approaches, mobile devices (e.g., an autonomous vehicle) can store and/or generate sensor data that needs to be processed in a cloud or other server (e.g., that is remotely located from the vehicle). For example, autonomous vehicles have ANNs configured to recognize and/or classify objects captured in camera images. Such images can be uploaded to the cloud or other server for processing, training, etc. The processing in the cloud or server is often performed via multiple layers of artificial neurons. After an image is processed by one or more layers, the output of the layers can be much smaller than the image itself.

However, sending image data for processing by the layers of the ANN at the cloud or server requires sending large data files or streams of image data (e.g., image streams from a camera of a vehicle). For example, this increases data traffic on the network (e.g., cellular or other wireless network) between a vehicle that collects the data and a remote cloud server. This significantly degrades performance of the network by requiring significant bandwidth to transfer the image or other sensor data. This also can cause a mobile device to consume excessive battery power, which may be limited for certain smaller mobile devices.

Various embodiments of the present disclosure provide a technological solution to one or more of the above technical problems. In one embodiment, a cloud server processes sensor data from a vehicle using an ANN. The ANN has several layers. In some cases, based on analyzing the nature of the sensor data (e.g., type or characteristic of data) received from the vehicle and/or other factors associated with a context associated with processing the sensor data (e.g., bandwidth consumption due to data traffic to or from the cloud server, and/or the environment in which a vehicle is operating such as daylight, night, and/or fog or rain), the cloud server decides to send one or more of the layers of the ANN for edge processing at the vehicle itself. In other cases, the cloud server decides to send the one or more layers to an edge server device located between the vehicle and the cloud server. By pushing processing for the one or more layers closer to the vehicle (or other source of data to be processed by an ANN), data traffic over one or more networks of a networked system can be decreased.

In one embodiment, an ANN includes a network of neurons stored on a computing device in memory. One layer of neurons generates outputs as inputs for the next layer of neurons. Each neuron takes one or more inputs to generate an output. In one example, one layer of neurons may be considered as one ANN and another layer of neurons as another ANN. Then, the connected layers are one combined ANN. The computation of a layer of neurons can be formulated to include an input vector multiplying a matrix for generating an output vector. In some cases, this matrix operation can be broken down into smaller matrix operations based on a hardware acceleration capability of one or more ANN accelerators.

In one embodiment, in view of the above, a computing device is configured to intelligently partition the computation of an ANN having multiple layers across multiple devices (e.g., cloud, edge server, vehicle, mobile device, etc.). For example, the vehicle has the sensors to generate the first input vector. The first input vector is to be multiplied by the matrix of a first layer of neurons to generate a first output vector for a second layer of neurons. Initially, all layers are in the cloud/server. If the cloud/server determines that it is advantageous for an edge server to process the first layer (instead of the cloud/server), the model of the first layer is pushed to the edge server such that the cloud/server gets the first output vector from the edge server, instead of the first input vector from the vehicle or edge server.

In one embodiment, the cloud/server monitors its ANN to determine which of one or more layers can be pushed to one or more edge servers configured on the communication paths from mobile devices to the cloud/server. When the processing by the pushed layers of the ANN is sufficient, the original images do not have to be uploaded to the cloud/server. Otherwise, the original images can be further uploaded from the edge servers to the cloud/server for further processing, as may be needed in certain cases.

In one embodiment, the ANN at the cloud/server can estimate a probability of an edge server uploading images after processing using the one or more layers of ANNs specified by the cloud/server if pushed to a vehicle or edge server for processing closer in a network to the source of the data for the images. In one embodiment, the cloud/server pushes processing to edge servers based on balancing the costs and benefits of processing at the edge servers over the required data traffic of pushing the layers to the edge servers, and the data traffic of uploading both the processing results of the edge servers and the original images when the processing results are insufficient.

In one embodiment, one or more portions of an ANN are selected by a server and pushed to a vehicle. In one example, each of the portions is a layer of the ANN. In one example, each of the portions is a portion of data for a neuron model of the ANN.

In one embodiment, a networked system (e.g., a network that provides a wireless and/or wired communication path between a vehicle and a cellular base station and/or server) includes at least one processing device (e.g. a CPU of a cloud server), and memory containing instructions configured to instruct the at least one processing device to perform a method. The method includes: receiving data over a network from a computing device (e.g., a controller of a memory device located in a vehicle), wherein the received data is processed using an artificial neural network (ANN), the ANN comprises a neuron model used for processing the data, and the computing device provides the data from processing sensor data obtained from at least one sensing device of a vehicle (e.g., a camera of the vehicle); sending, to the computing device, a first portion of the neuron model, wherein the first portion is selected based on predicted data traffic associated with processing the sensor data, the predicted data traffic including at least one of data traffic to the computing device, or data traffic from the computing device; receiving, from the computing device, an intermediate result, wherein the computing device provides the intermediate result based on processing the sensor data using the first portion (e.g., output from processing sensor data using a first layer of the ANN); and providing, by processing the intermediate result using a second portion of the neuron model, an output (e.g., the intermediate result is input to a second layer of the ANN).

In one example, the output is used to control a system of a vehicle. In one example, a cloud server sends the output to the vehicle to cause a control action on the vehicle. In one example, the controlled system can be an engine, steering, braking, or other component of a vehicle that can be electronically controlled.

In one embodiment, a set of sensors is configured on a vehicle, and an edge server may be on the vehicle or in a base station (e.g., 5G base station or connected to the base station via a local area network), and the edge server communicates with a cloud server. Sensor data goes to the edge server and then to the cloud server. The edge server and the cloud server are separated by a network, and work together to process the sensor data using an ANN. The output from the ANN at the cloud server may or may not go back to the vehicle that provides the input sensor data.

In one example, a layer is a set of artificial neurons, and an intermediate result is the output of the artificial neurons in the layer downloaded to the edge server. An artificial neuron is a set of data that specifies the behavior of the neuron and/or its state. In one example, a layer of the ANN is identified that can be pushed to the edge server (e.g., finding an improved or optimal way to cut the ANN into two portions such that the portion that is the first layer can be pushed to the edge server for an improved or optimal result).

FIG. 1 illustrates a data processing system that uses edge processing of data (e.g., sensor or other data) to reduce data traffic on a network (e.g., data traffic between a mobile device such as a vehicle and the cloud using a wireless network, where the data traffic is associated with processing of sensor data collected by the mobile device) according to one embodiment. A vehicle 102 contains one or more sensing device(s) 104. A computing device 110 within the vehicle 102 processes sensor data 106 from the sensing device 104 and outputs an intermediate result 130. The intermediate result 130 is sent through a network 136 to a computing device 138. The computing device 138 generally processes the intermediate result 130 using an artificial neural network (ANN) 150 to produce an output 162. The output 162 may be used to control an action 166 of the vehicle 102. To reduce data traffic 134, the computing device 138 may partition the ANN 150 into multiple portions (e.g., portion 154, portion 156, portion 158, etc.) and send portions of the ANN 150 to other devices (e.g., computing device 110) to process sensor data 106. In one example, each portion is part of a neuron model of ANN 150.

The vehicle 102 may be, for example, an autonomous vehicle. The sensing device 104 may be, for example, an image sensor, LIDAR, RADAR, GPS, or other type of sensor. The sensing device 104 outputs collected sensor data 106 (e.g., images, GPS location, etc.) to the computing device 110.

The computing device 110 may be, for example, a computer, embedded computer, controller in a vehicle, server, laptop, tablet or other electronic device controlled by a processing device. In some embodiments, the computing device 110 may be described as an edge processing device.

In one embodiment, the computing device 110 contains a processing device 116 and memory 118. The processing device 116 may be, for example, a microprocessor, graphics processor, embedded processor, embedded controller, central processing unit (CPU), system on a chip (SOC), application specific integrated circuit (ASIC), field programmable gate array (FPGA), or other processing device. The processing device 116 may be composed of a single processor with a single processing core, a single processor with multiple processing cores, or multiple processors. The processing device 116 and memory 118 may be configured on a printed circuit board. In some instances, the processing device 116 and the memory 118 are packaged together in a System on Chip (SoC).

The memory 118 can include volatile memory (e.g., DRAM and/or SRAM) and/or non-volatile memory. The memory 118 may be separate from the processing device 116 (e.g., DIMM modules, SIMM modules, NVMe modules, etc.) or may be embedded within the processing device 116 (e.g., High Bandwidth Memory (HBM)).

Examples of non-volatile memory include flash memory, memory units formed based on negative-and (NAND) logic gates, negative-or (NOR) logic gates, Phase-Change Memory (PCM), magnetic memory (MRAM), resistive random-access memory (RRAM), cross point memory, and other memory devices. A cross point memory device can use transistor-less memory elements, each of which has a memory cell and a selector that are stacked together as a column. Memory element columns are connected via two lays of wires running in perpendicular directions, where wires of one lay run in one direction in the layer located above the memory element columns, and wires of the other lay are in another direction and in the layer located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM), etc.

The memory 118 contains instructions 120 instructing the processing device 116 to perform tasks such as, for example, receive a portion 154 of the ANN 150 from the computing device 138, process sensor data 106 using the ANN 122, send an intermediate result 130 to the computing device 138 after processing sensor data 106, etc.

The processing device 116 sends an intermediate result 130 through a network 136 to the computing device 138. The network 136 may include wireless networks or combinations of wireless and wired networks. The network 136 may also include networking services such as, for example, cellular phone, satellite, or internet services and networking equipment such as, satellites, cellular phone towers, cellular phone base stations, network switches, network routers, etc. The volume of data (e.g., Megabytes/second or Gigabytes/second) transmitted between the computing device 138 and the computing device 110 is represented in FIG. 1 as data traffic 134. Data traffic 134 may include, for example, an intermediate result 130 sent to the computing device 138, sensor data 106 sent to the computing device 138 for further processing, a portion 154 of the ANN 150 sent to the computing device 110, a portion 158 of the ANN 150 sent to the sensing device 104, etc.

The computing device 138 receives input data 140 (e.g., intermediate result 130) from the network 136. The computing device 138 may be, for example, a computer, embedded computer, server, laptop, tablet or other electronic device controlled by a processing device.

In one embodiment, the computing device 138 contains a processing device 144 and memory 146. The processing device 144 may be, for example, a microprocessor, graphics processor, embedded processor, embedded controller, central processing unit (CPU), system on a chip (SOC), application specific integrated circuit (ASIC), field programmable gate array (FPGA), or other processing device. The processing device 144 and memory 146 may be configured on a printed circuit board. In some instances, the processing device 144 and the memory 146 are packaged together in a System on Chip (SoC).

The memory 146 can include volatile memory (e.g., DRAM and/or SRAM) and/or non-volatile memory (e.g., NAND flash, NOR flash, PCM, MRAM, RRAM, cross point memory, ROM, PROM, EPROM, EEPROM, etc.). The memory 146 may be separate from the processing device 144 (e.g., DIMM modules, SIMM modules, NVMe modules, etc.) or may be embedded within the processing device 144 (e.g., HBM memory).

The memory 146 contains instructions 148 instructing the processing device 144 to perform tasks such as, for example, receive a request from the computing device 110 for a portion 154 of the ANN 150, send a portion 154 of the ANN 150 to the computing device 110, process input data 140 (e.g., intermediate result 130) using at least a portion 156 of the ANN 150, provide output 162 based on processing the intermediate result 130 from the computing device 110, etc.

The processing device 144 contains the ANN 150 (e.g., stored in memory). The ANN 150 uses a network of neurons to process inputs to the network and to generate outputs from the network.

For example, each neuron in the network receives a set of inputs. Some of the inputs to a neuron may be the external inputs provided into the neural network and some of the inputs to a neuron may be the outputs of certain neurons in the network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions.

For example, each neuron can generate a weighted sum of its inputs and its bias and then produce an output that is the function of the weighted sum, computed using the activation function of the neuron. Input to an ANN can be described as an input vector and the output can be described as an output vector.

The relations between the input(s) and the output(s) of an ANN in general are defined by a neuron model that includes the data representing the connectivity of the neurons in the ANN, as well as the bias, activation function, and synaptic weights of each neuron. Using a given neuron model 152, a computing device 138 computes the output 162 of the ANN 150 from a given set of input data 140 to the ANN 150.

For example, input data 140 to the ANN 150 may be generated based on camera output from the sensing device 104. The output 162 from the ANN 150 may be the identification of an item, such as an object or an event.

In one embodiment, the ANN 150 is a spiking neural network (SNN). An SNN is a type of ANN that closely mimics natural neural networks. An SNN neuron produces a spike as output when the activation level of the neuron is sufficiently high. The activation level of an SNN neuron mimics the membrane potential of a natural neuron. The outputs/spikes of the SNN neurons can change the activation levels of other neurons that receive the outputs. The current activation level of an SNN neuron as a function of time is typically modeled using a differential equation and considered the state of the SNN neuron. Incoming spikes from other neurons can push the activation level of the neuron higher to reach a threshold for spiking. Once the neuron spikes, its activation level is reset. Before spiking, the activation level of the SNN neuron can decay over time, as controlled by the differential equation. The element of time in the behavior of SNN neurons makes an SNN suitable for processing spatiotemporal data. The connectivity of an SNN is often sparse, which is advantageous in reducing computational workload.

In general, an ANN may be trained using a supervised method where the parameters in the ANN are adjusted to minimize or reduce the error between known outputs resulted from respective inputs and computed outputs generated from applying the inputs to the ANN. Examples of supervised learning/training methods include reinforcement learning, and learning with error correction.

Alternatively, or in combination, an ANN may be trained using an unsupervised method where the exact outputs resulting from a given set of inputs are not known before the completion of the training. The ANN can be trained to classify an item into a plurality of categories, or data points into clusters. Multiple training algorithms can be employed for a sophisticated machine learning/training paradigm.

The computing device 110 takes input data 112 (e.g., sensor data 106) and generates an intermediate result 130. In one embodiment, the computing device 110 passes input data 112 out as an intermediate result 130 without processing the input data 112 with an ANN. The computing device 138 takes the intermediate result 130 as input data 140. The ANN 150 uses the input data 140 as input to the neuron model 152 and calculates an output 162.

The computing device 138 may determine that data traffic 134 between the computing device 110 and the computing device 138 may be reduced by processing a portion of the sensor data 106 within the computing device 110. The computing device 138 may select a set of neurons (e.g., a portion 154 of the ANN 150) and send the set of neurons to the computing device 110 to form an ANN 122 within the computing device 110.

In one example, ANN 122 is a subset of ANN 150. In one example, ANN 122 includes neuron model data that is not present in ANN 150. In one example, ANN 122 is maintained by computing device 138 to include some or all portions of ANN 150 (e.g., the included portions may be predetermined or determined in real-time based on a context of vehicle 102).

The computing device 138 may select the set of neurons for sending to computing device 110 based on factors such as, for example, comparing the predicted data size 114 of input data 112 into the computing device 110 to the predicted data size 132 of the intermediate result 130 output from the computing device 110; or comparing the predicted data size 114 of the input data 112 to be processed using the portion 154 of the ANN 150 to the data size 160 of the portion 154 of the ANN 150; or predicting whether sensor data 106 will need to be uploaded to the computing device 138 for further processing after the intermediate result 130 is provided.

For example, the computing device 110 may receive sensor data 106 (e.g., image data from an image sensor). The computing device 138 may predict the data size 114 (e.g., a 10 MB per second input vector) of the sensor data 106 input to the computing device 110. The computing device 138 may predict that the data size 132 of the intermediate result 130 output from computing device 110 will be smaller (e.g., 1 MB per second output vector) if some of the processing performed by the ANN 150 (e.g., detecting objects in an image) is performed by the computing device 110. The computing device 138 may select a portion 154 of the neuron model 152 (e.g., neurons associated with detecting objects in images) and send the portion 154 of the neuron model 152 to the computing device 110 to be implemented as a neuron model 124 within an ANN 122. The ANN 122 takes sensor data 106 as an input vector, processes the data, and outputs an intermediate result 130 as an output vector.

In one example, sensor data 106 from the sensing device 104 (e.g., image data from an image sensor) may need to be sent to the computing device 138 for further processing after the intermediate result 130 has been provided. This may be due, for example, to glare causing an inconclusive intermediate result 130. The computing device 138 may include predicting whether the sensor data 106 will need to be uploaded to the computing device 138 for further processing as part of determining whether to perform processing for a portion 154 of the ANN 150 on the computing device 110.

In one example, the computing device 138 may predict a certain data size 108 from the sensing device 104. The computing device 138 may determine that a portion 154 of the ANN 150 used for processing sensor data 106 is smaller than the predicted data size 108 of the sensor data 106 from the sensing device 104. For example, the computing device 138 may predict a data size 108 of 1 TB from the sensing device 104. The computing device 138 may determine, for example, that a portion 154 of the ANN 150 has a data size 160 of 50 MB. The computing device 138 may select a portion 154 of the ANN 150 to send to the computing device 110 based on the data size 160 of the portion 154 of the ANN 150 being less than the predicted data size 108 of the sensor data 106 from the sensing device 104.

In one embodiment, the processing device 116 predicts data traffic 134 between the computing device 110 and the computing device 138 generated by processing the sensor data 106. Based on the predicted data traffic 134, the processing device 116 may request a portion 154 of the ANN 150 from the computing device 138. The computing device 138 sends a portion 154 of the ANN 150 to the processing device 116. The processing device 116 uses the portion 154 of the neuron model 152 from the computing device 138 to create a neuron model 124 within an ANN 122. The processing device 116 uses the ANN 122 to process sensor data 106 and output an intermediate result 130.

For example, sensor data 106 may be image data from a camera. The processor 116 may predict that sending the image data as an intermediate result 130 to the computing device 138 will result in a large amount of data traffic 134 (e.g., data size 132 of 15 MB per second). The processing device 116 may request a portion 154 of the ANN 150 and implement the received portion 154 in an ANN 122. The processor 116 processes the image data using the ANN 122 (e.g., identifying or classifying objects or events). After processing the image data, the data size 132 of the intermediate result 130 may be smaller (e.g., 2 MB per second) resulting in less data traffic 134.

The computing device 138 takes input data 140 (e.g., an intermediate result 130) and processes the data using a portion 156 of the ANN 150 to generate an output 162. The output 162 may be sent back to the vehicle 102. The vehicle 102 may use the output 162 to control an action 166 of the vehicle 102. For example, an intermediate result 130 may identify an object or an event (e.g., a pedestrian entering the path of the vehicle). The output 162 may instruct an action 166 for the vehicle 102 (e.g., stop or change lanes). The vehicle 102 may control an action 166 of the vehicle 102 (e.g., apply the brakes or steer the vehicle) based on the output 162.

In various embodiments, edge processing of sensor data as described above can be implemented in a networked system that permits communication between a vehicle and a cloud server (or other computing device). The networked system includes at least one vehicle and at least one computing device (e.g., vehicle 102, and computing devices 110, 138). The networked system is configured to implement edge processing using a portion of an ANN selected and sent from a computing device to reduce data traffic in the networked system.

The networked system is networked via one or more communications networks. The communication networks (e.g., network 136) can include at least a local device network such as Bluetooth or the like, a wide area network (WAN), a local area network (LAN), the Intranet, a mobile wireless network such as 4G or 5G, an extranet, the Internet, and/or any combination thereof. Nodes of the networked system (e.g., vehicles and/or other mobile/computing devices) can each be a part of a peer-to-peer network, a client-server network, a cloud computing environment, or the like. Also, any of apparatuses, computing devices, vehicles, sensors or cameras, and/or user interfaces in the networked system can include a computing system of some sort. A computing system can include a network interface to other devices in a LAN, an intranet, an extranet, and/or the Internet. The computing system can also operate in the capacity of a server or a client machine in a client-server network environment, as a peer machine in a peer-to-peer (or distributed) network environment, or as a server or a client machine in a cloud computing infrastructure or environment.

Figure 2:
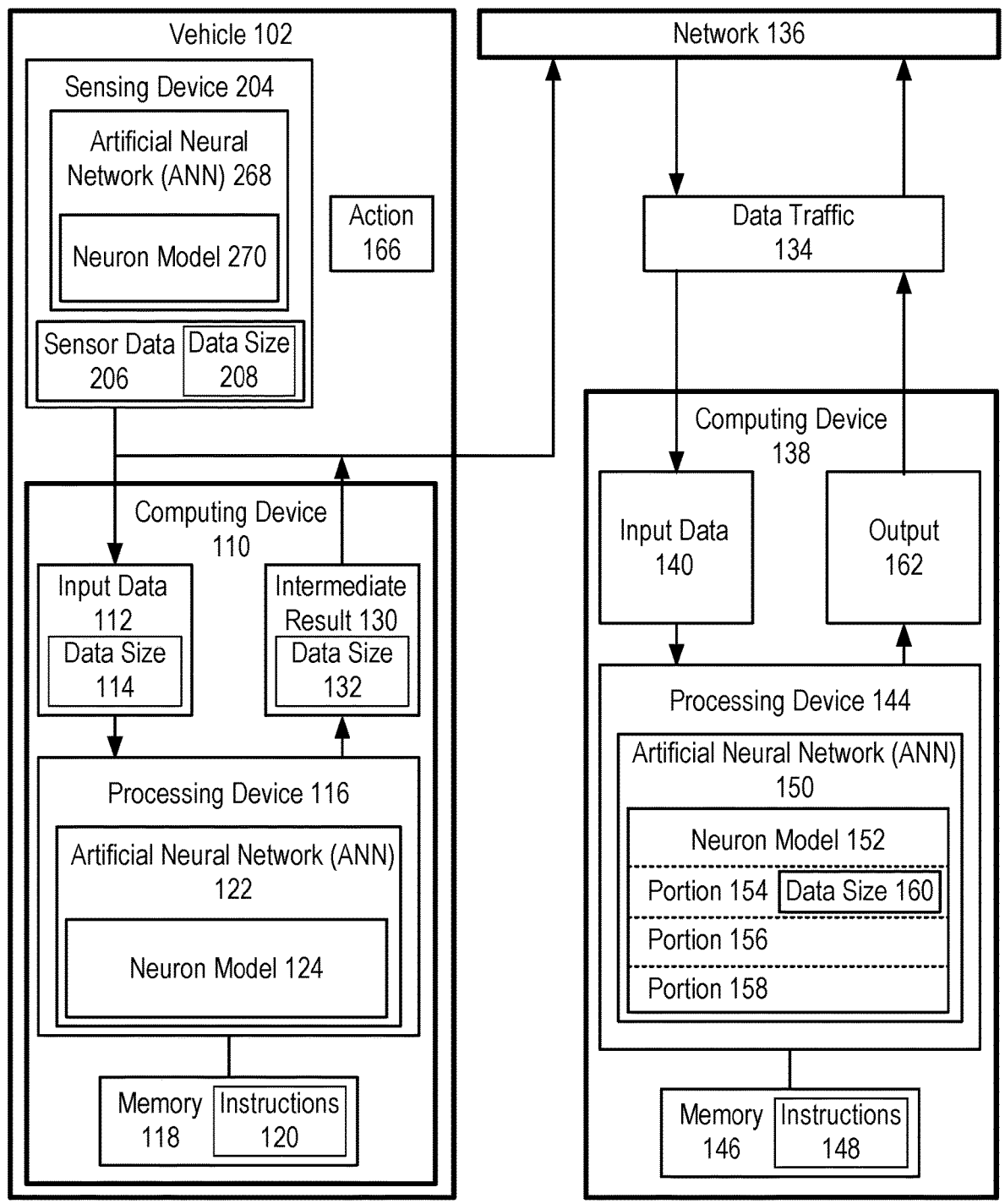
FIG. 2 illustrates a computing device that determines to perform processing for a portion of an ANN on a vehicle to reduce data traffic according to one embodiment.

FIG. 2 illustrates an embodiment in which computing device 138 determines to perform processing for portion 158 of the ANN 150 on the vehicle 102 (e.g., in the sensing device 204). The computing device 138 sends portion 158 of the ANN 150 to the sensing device 204. The sensing device 204 uses the portion 158 of the neuron model 152 from the computing device 138 to create a neuron model 270 within an ANN 268. The sensing device 204 uses the ANN 268 to process data collected from the sensing device 204 and outputs the processed data as sensor data 206. The computing device 110 takes the sensor data 206 as input data 112 and further processes the data using the ANN 122 to output an intermediate result 130. In this configuration, the sensing device 204 may be described as an edge processing device.

For example, the sensing device 204 may be an image sensor. The computing device 138 may determine it is advantageous to process data from the image sensor within the image sensor itself (e.g., by performing object identification). The computing device 138 sends a portion 158 of the ANN 150 to the sensing device 204. The sensing device 204 uses the portion 158 of the neuron model 152 to create a neuron model 270 within ANN 268. The sensing device 204 uses the ANN 268 to process data collected from the image sensor and outputs sensor data 206 (e.g., an object identified as a pedestrian).

The processing device 116 takes input data 112 (e.g., sensor data 206), further processes the input data 112 using the ANN 122, and outputs an intermediate result 130. For example, the intermediate result 130 may be an event detection (e.g., that the trajectory of the pedestrian identified in the sensor data 206 will intersect the trajectory of the vehicle 102). Performing processing of portion 158 of the ANN 150 within the sensing device 204 may reduce the data size 208 of the sensor data 206 from the sensing device 204 and reduce data traffic 134 to the computing device 138, since the sensing device 204 would not need to send all the image data out for processing.

Figure 3:
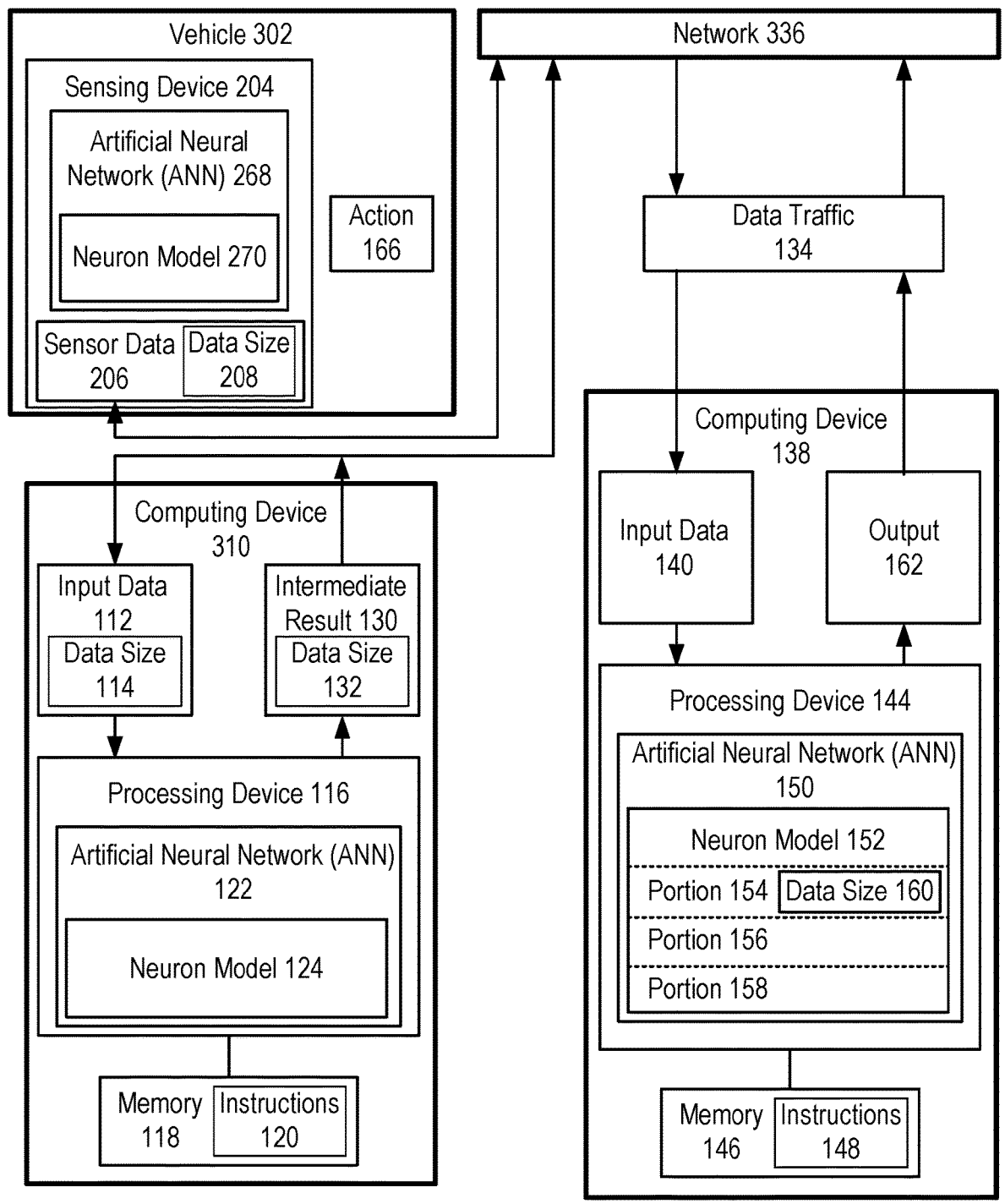
FIG. 3 illustrates a computing device that is separate from a vehicle and used to process data from the vehicle to reduce data traffic according to one embodiment.

FIG. 3 illustrates an embodiment in which computing device 310 is separate from the vehicle 302. In one embodiment, the computing device 310 (e.g., a 5G base station) and the computing device 138 (e.g., a cloud server) are both servers. The computing device 310 is on a communication path between the vehicle 302 and the computing device 138. The vehicle 302 outputs sensor data 206 to the network 336 and the network 336 routes the sensor data 206 to the computing device 310. The computing device 310 processes the sensor data 206 similarly as described for FIG. 2. The computing device 310 may be described as an edge processing device. In one embodiment, the network 336 is the same network 136 as described for FIG. 1.

Figure 4:
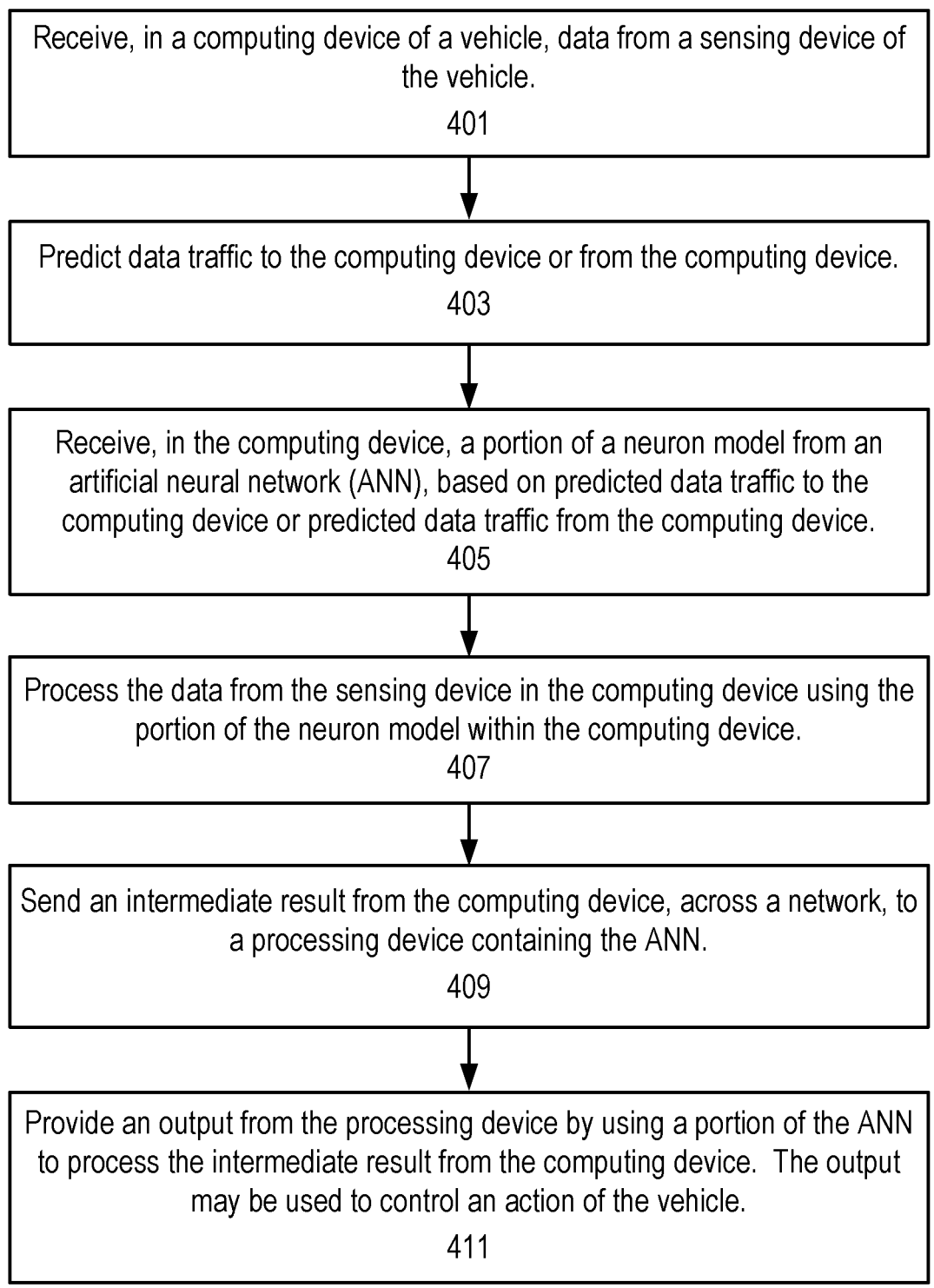
FIG. 4 shows a method of processing sensor data that is implemented using a computing device of a vehicle according to one embodiment.

FIG. 4 shows a method of processing sensor data implemented on a vehicle according to one embodiment. For example, the method of FIG. 4 can be implemented in vehicle 102 of FIG. 1 in connection with network 136 and computing device 138 of FIG. 1.

The method of FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 4 is performed at least in part by one or more processing devices.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 401, data is received by a computing device of a vehicle from a sensing device of the vehicle. In one example, a computing device 110 of a vehicle 102 receives sensor data 106 from a sensing device 104 of the vehicle 102.

At block 403, data traffic to and/or from the computing device of the vehicle is predicted. In one example, data traffic 134 to the computing device 110 or from the computing device 110 is predicted by computing device 138.

At block 405, a portion of a neuron model from an artificial neural network (ANN) is received in the computing device based on predicted data traffic to or from the computing device (e.g., data traffic between the computing device and a cloud server). In one example, portion 154 of neuron model 152 from ANN 150 is received in the computing device 110, based on predicted data traffic 134 to the computing device 110 and/or from the computing device 110.

At block 407, data from the sensing device is processed in the computing device using the portion of the neuron model stored within the computing device. In one example, the computing device 110 uses the portion of the neuron model 124 within the computing device 110 to process the sensor data 106 from the sensing device 104.

At block 409, an intermediate result is sent from the computing device across a network to a processing device that stores the ANN. In one example, the computing device 110 sends intermediate result 130, across network 136, to a processing device 144 (e.g., in a cloud network) containing the ANN 150.

At block 411, an output is provided from the processing device by using a portion of the ANN to process the intermediate result from the computing device. In one example, the processing device 144 uses portion 156 of the ANN 150 to process the intermediate result 130 from computing device 110 and provide output 162. Output 162 may be used to control an action 166 of the vehicle 102 (and/or to control another vehicle).

Figure 5:
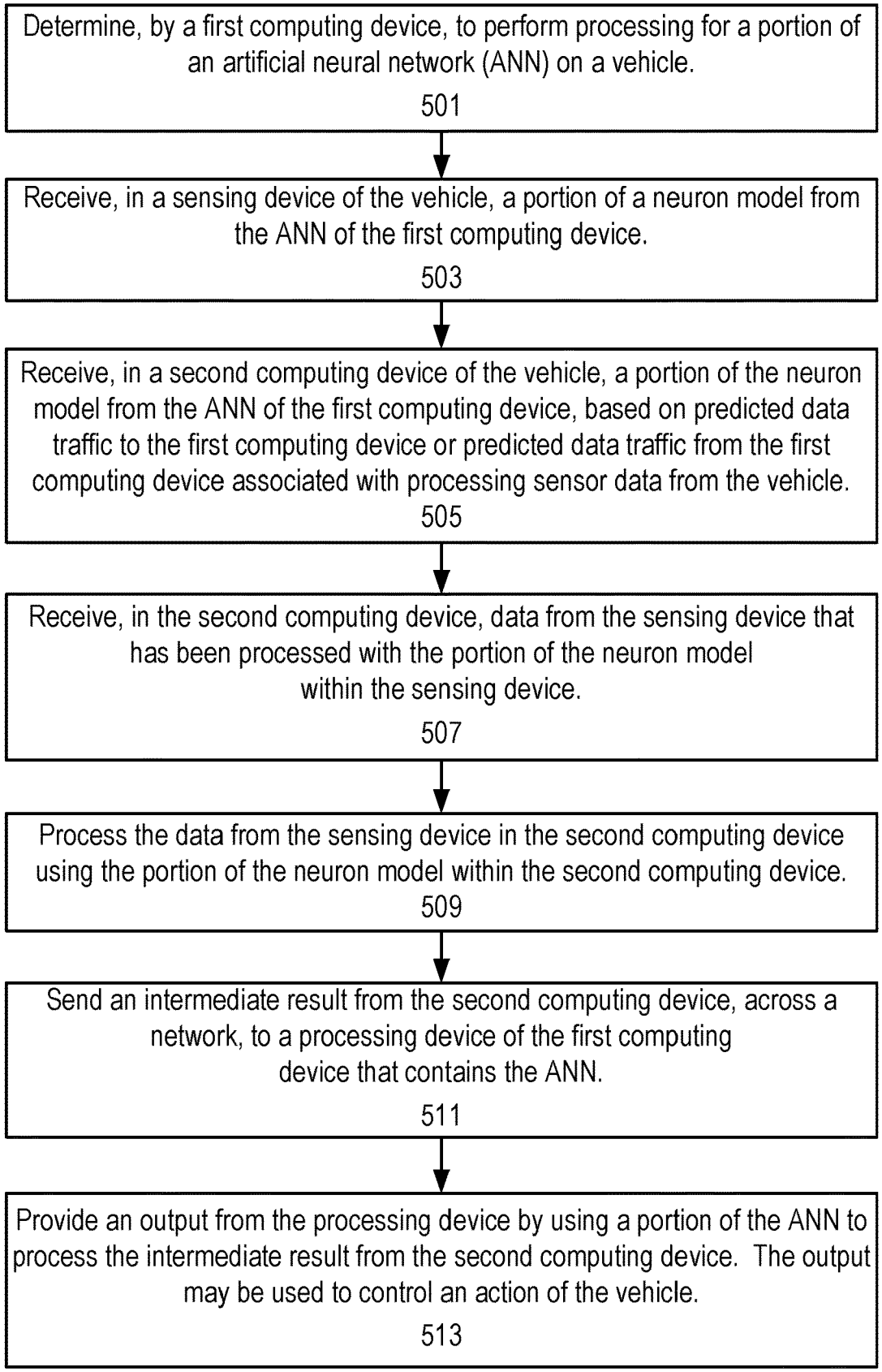
FIG. 5 shows a method of processing sensor data by a computing device using a portion of an ANN received from another computing device according to one embodiment.

FIG. 5 shows a method of processing sensor data implemented on a vehicle according to one embodiment. For example, the method of FIG. 5 can be implemented in vehicle 102 of FIG. 2 in connection with network 136 and computing device 138 of FIG. 2.

The method of FIG. 5 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 5 is performed at least in part by one or more processing devices.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 501, a first computing device determines to perform processing for a portion of an artificial neural network (ANN) on a vehicle. In one example, a first computing device 138 determines to perform processing for a portion 158 of an ANN 150 on a vehicle 102.

At block 503, a sensing device of the vehicle receives a portion of a neuron model from the ANN of the first computing device. In one example, a sensing device 204 receives a portion 158 of a neuron model 152 from the ANN 150 of the first computing device 138.

At block 505, a second computing device of the vehicle receives a portion of the neuron model from the ANN of the first computing device, based on predicted data traffic to and/or from the first computing device that is associated with processing sensor data from the vehicle. In one example, a portion 154 of the neuron model 152 from the ANN 150 is received in a second computing device 110 of the vehicle 102, based on predicted data traffic 134 to the first computing device 138 or from the first computing device 138, associated with processing sensor data 206 from the sensing device 204 of the vehicle 102.

At block 507, the second computing device receives data from the sensing device that has been processed with the portion of the neuron model stored within the sensing device. In one example, the computing device 110 receives sensor data 206 that has been processed in the sensing device 204 using the portion of the neuron model 270 within the sensing device 204.

At block 509, the data from the sensing device is processed in the second computing device using the portion of the neuron model stored within the second computing device. In one example, the computing device 110 processes sensor data 206 from the sensing device 204 using the portion of the neuron model 124 within the computing device 110.

At block 511, an intermediate result is sent from the second computing device across the network to a processing device of the first computing device that stores the ANN. In one example, the computing device 110 sends an intermediate result 130, across a network 136, to a processing device 144 containing the ANN 150.

At block 513, an output is provided from the processing device by using a portion of the ANN to process the intermediate result from the second computing device. In one example, the processing device 144 uses a portion 156 of the ANN 150 to process the intermediate result 130 from the computing device 110 and provide an output 162. The output 162 may be used to control an action 166 of the vehicle 102.

Figure 6:
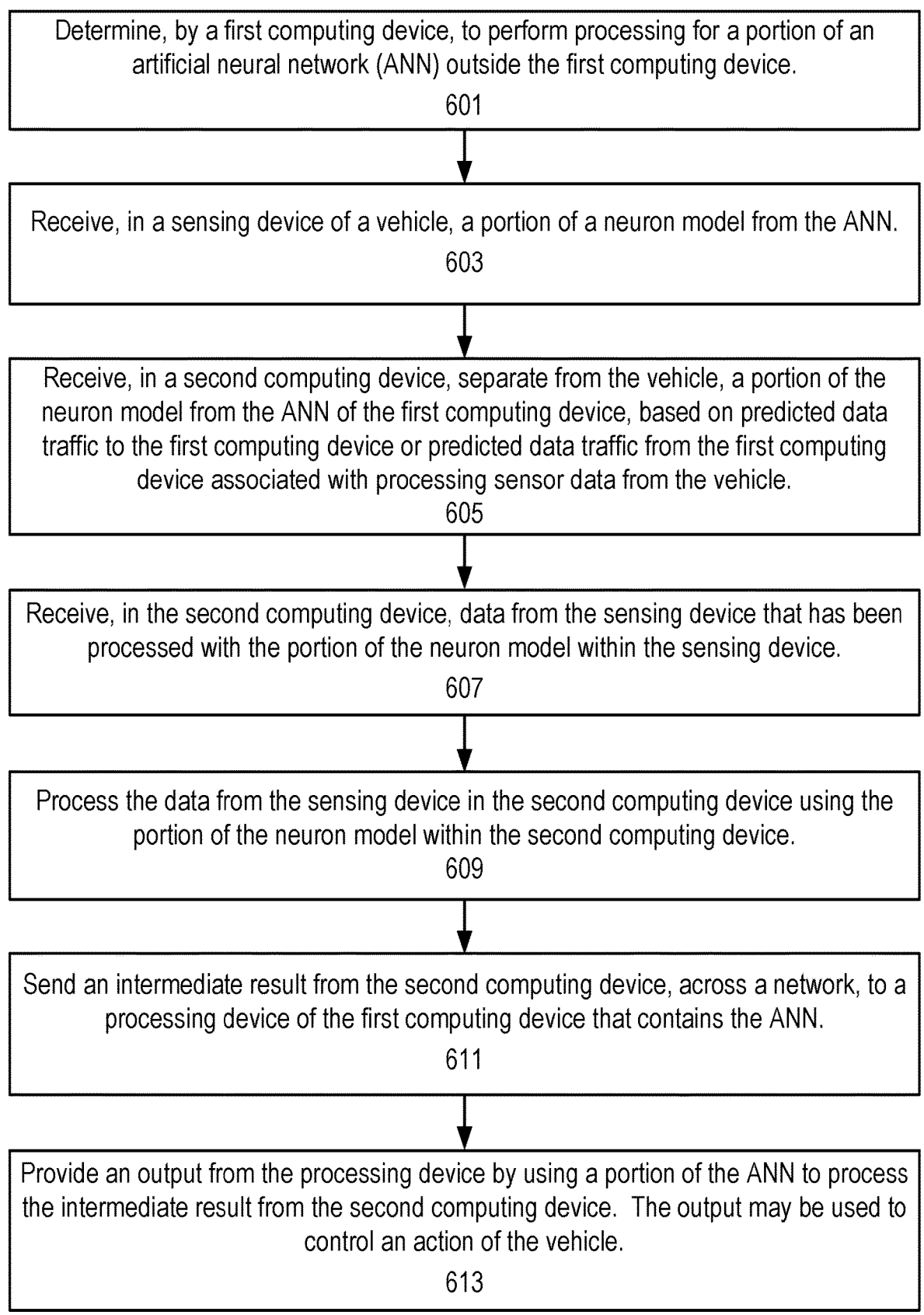
FIG. 6 shows a method of processing sensor data from a sensor of a vehicle according to one embodiment.

FIG. 6 shows a method of processing sensor data from a sensor of a vehicle according to one embodiment. For example, the method of FIG. 6 can be implemented in the vehicle 302 of FIG. 3 in connection with the network 336, computing device 310 and computing device 138 of FIG. 3.

The method of FIG. 6 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 6 is performed at least in part by one or more processing devices.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 601, a first computing device determines to perform processing for a portion of an artificial neural network (ANN) outside the first computing device. In one example, a first computing device 138 determines to perform processing for a portion 158 of an ANN 150 on a vehicle 302.

At block 603, a sensing device of a vehicle receives a portion of a neuron model from the ANN. In one example, a sensing device 204 receives a portion 158 of a neuron model 152 from the ANN 150 of the first computing device 138.

At block 605, a second computing device that is separate from the vehicle receives a portion of the neuron model from the ANN of the first computing device, based on predicted data traffic to and/or from the first computing device that is associated with processing sensor data from the vehicle. In one example, a portion 154 of the neuron model 152 from the ANN 150 is received in a second computing device 310, separate from the vehicle 302, based on predicted data traffic 134 to the first computing device 138 or from the first computing device 138, associated with processing sensor data 206 from the sensing device 204 of the vehicle 302.

At block 607, the second computing device receives data from the sensing device that has been processed with the portion of the neuron model stored within the sensing device. In one example, the second computing device 310 receives sensor data 206 that has been processed in the sensing device 204 using the portion of the neuron model 270 within the sensing device 204.

At block 609, the data from the sensing device is processed in the second computing device using the portion of the neuron model stored within the second computing device. In one example, the second computing device 310 processes sensor data 206 from the sensing device 204 using the portion of the neuron model 124 within the second computing device 310.

At block 611, an intermediate result is sent from the second computing device across a network to a processing device of the first computing device that stores the ANN. In one example, the second computing device 310 sends an intermediate result 130, across a network 336, to a processing device 144 containing the ANN 150.

At block 613 an output from the processing device is provided by using a portion of the ANN to process the intermediate result from the second computing device. In one example, the processing device 144 uses a portion 156 of the ANN 150 to process the intermediate result 130 from the second computing device 310 and provides an output 162. The output 162 may be used to control an action 166 of the vehicle 302.

In some embodiments, edge processing of data (e.g., sensor or other data) as described above is implemented using a cloud system. In one example, a computing environment operates in conjunction with embodiments of the present disclosure. The components of the computing environment may be implemented using any desired combination of hardware and software components.

The exemplary computing environment may include a client computing device, a provider server, an authentication server, and/or a cloud component, which communicate with each other over a network (e.g., network 136).

The client computing device may be any computing device such as desktop computers, laptop computers, tablets, PDAs, smart phones, mobile phones, smart appliances, wearable devices, IoT devices, in-vehicle devices, and so on. According to various embodiments, the client computing device accesses services at the provider server (e.g., computing device 138).

The client computing device (e.g., computing device 110) may include one or more input devices or interfaces for a user of the client computing device. For example, the one or more input devices or interfaces may include one or more of: a keyboard, a mouse, a trackpad, a trackball, a stylus, a touch screen, a hardware button of the client computing device, and the like. The client computing device may be configured to execute various applications (e.g., a web browser application) to access the network.

The provider server may be any computing device configured to host one or more applications/services. In some embodiments, the provider server may require security verifications before granting access to the services and/or resources provided thereon. In some embodiments, the applications/services may include online services that may be engaged once a device has authenticated its access. In some embodiments, the provider server may be configured with an authentication server for authenticating users and/or devices. In other embodiments, an authentication server may be configured remotely and/or independently from the provider server.

The network may be any type of network configured to provide communication between components of the cloud system. For example, the network may be any type of network (including infrastructure) that provides communications, exchanges information, and/or facilitates the exchange of information, such as the Internet, a Local Area Network, Wide Area Network, Personal Area Network, cellular network, near field communication (NFC), optical code scanner, or other suitable connection(s) that enables the sending and receiving of information between the components of the cloud system. In other embodiments, one or more components of the cloud system may communicate directly through a dedicated communication link(s).

In various embodiments, the cloud system may also include one or more cloud components. The cloud components may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.). In some embodiments, either one or both of the provider server and the authentication server may be configured to operate in or with cloud computing/architecture such as: infrastructure a service (IaaS), platform as a service (PaaS), and/or software as a service (SaaS).

In one embodiment, a system for edge processing to reduce data traffic on a network comprises: at least one processing device (e.g., 144); and memory containing instructions configured to instruct the at least one processing device to: receive data over a network from a computing device (e.g., 110), wherein the received data is processed using an artificial neural network (ANN), the ANN comprises a neuron model (e.g., 152) used for processing the data, and the computing device provides the data from processing sensor data (e.g., 106) obtained from at least one sensing device (e.g., 104) of a vehicle; send, to the computing device, a first portion (e.g., 154) of the neuron model, wherein the first portion is selected based on predicted data traffic (e.g., 134) associated with processing the sensor data, the predicted data traffic including at least one of data traffic to the computing device, or data traffic from the computing device; receive, from the computing device, an intermediate result (e.g., 130), wherein the computing device provides the intermediate result based on processing the sensor data using the first portion; and provide, by processing the intermediate result using a second portion (e.g., 156 or 158) of the neuron model, an output.

In one embodiment, selecting the first portion of the neuron model based on predicted data traffic comprises selecting a set of neurons from the neuron model, and selecting the set of neurons is based on at least one of comparing a data size of input data to be processed using the first portion to a data size of output data to be obtained from processing using the first portion, or comparing a data size of input data to be processed using the first portion to a data size of the first portion.

In one embodiment, the instructions are further configured to instruct the at least one processing device to: predict, using at least a portion of the ANN, that the data size of the sensor data processed using the first portion is greater than the data size of the first portion; wherein the first portion is sent to the computing device in response to the predicting that the data size of the sensor data processed using the first portion is greater than the data size of the first portion.

In one embodiment, a method comprises: processing, by a first computing device (e.g., 138) and using an artificial neural network (ANN), data received over a network from a second computing device (e.g., 110), wherein the ANN comprises a neuron model used for processing the data, the second computing device processes sensor data from at least one sensing device of a vehicle (e.g., 102), and the second computing device provides the received data from processing the sensor data; determining, by the first computing device, to perform processing for a first portion of the neuron model on the second computing device; in response to determining to perform processing for the first portion of the neuron model on the second computing device, sending the first portion over the network to the second computing device, wherein the second computing device provides an intermediate result based on processing the sensor data using the first portion; receiving, from the second computing device, the intermediate result; and processing, by the first computing device, the intermediate result using a second portion of the neuron model to provide an output.

In one embodiment, the first computing device is a first server, and the second computing device is a second server (e.g., 310) on a communication path between the vehicle and the first server.

In one embodiment, the determining to perform the processing for the first portion on the second computing device comprises at least one of comparing a data size of the sensor data to a data size of the intermediate result, comparing a data size of the sensor data to a data size of the first portion, or comparing a data size of the intermediate result to a data size of the first portion.

In one embodiment, the sensor data is an first input vector, and the intermediate result is a first output vector.

In one embodiment, the determining to perform the processing for the first portion of the neuron model on the second computing device further comprises predicting at least one of the data size of the first input vector, or the data size of the first output vector.

In one embodiment, the determining to perform the processing for the first portion on the second computing device is based on determining whether the sensor data will be uploaded to the first computing device after the intermediate result is provided.

In one embodiment, the at least one sensing device comprises an image sensor.

In one embodiment, the method further comprises: determining, by the first computing device, to perform processing for a third portion of the ANN on the vehicle; and in response to determining to perform processing for the third portion on the vehicle, sending the third portion over a network to the at least one sensing device (e.g., 204), wherein: the at least one sensing device generates the sensor data using the third portion to process at least one image from an image sensor; and the at least one sensing device sends the generated sensor data to the second computing device for use in determining the intermediate result.

In one embodiment, the method further comprises sending, to the vehicle, the output to control an action on the vehicle.

In one embodiment, the second computing device is a controller in a computer system of the vehicle.

In one embodiment, the sensor data corresponds to an image collected by an image sensor of the vehicle, and the intermediate result comprises at least one of an identification of an object in the image, or a classification of the object.

In one embodiment, the determining to perform the processing for the first portion of the neuron model on the second computing device comprises evaluating data traffic between the first computing device and the second computing device that is associated with providing the output.

In one embodiment, the data traffic is associated with at least one of receiving the sensor data from the second computing device after determining that the sensor data requires further processing by the ANN at the first computing device, sending the first portion to the second computing device, or receiving the intermediate result from the second computing device.

In one embodiment, the method further comprises selecting the first portion of the neuron model for sending to the second computing device, wherein the selecting is based on predicted data traffic between the first computing device and the second computing device.

In one embodiment, a system comprises: at least one processing device (e.g., 116); and memory containing instructions configured to instruct the at least one processing device to: process, using at least one portion of an artificial neural network (ANN), sensor data (e.g., 106) obtained from at least one sensing device of a vehicle; send, over a network to a computing device (e.g., 138), results from processing the sensor data; receive, from the computing device, a first portion of the ANN, the first portion selected based on a prediction of data traffic associated with processing the sensor data, the predicted data traffic including at least one of data traffic to the computing device, or data traffic from the computing device; and send, to the computing device, an intermediate result (e.g., 130) determined based on processing the sensor data using the first portion, wherein the computing device provides an output used to control the vehicle, and the output is obtained by processing the intermediate result using a second portion of the ANN.

In one embodiment, the instructions are further configured to instruct the at least one processing device to: compare a data size (e.g., 108) of the sensor data to a data size (e.g., 160) of the first portion (e.g., 154) of the ANN; and send, to the computing device and based on the comparing the data size of the sensor data to the data size of the first portion, a request for the first portion; wherein the first portion is received from the computing device in response to the request.

In one embodiment, the first portion is selected to reduce predicted data traffic to and/or from the computing device when processing the sensor data using the ANN.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
   at least one processing device; and
   memory containing instructions configured to instruct the at least one processing device to:
   receive data over a network from a computing device, wherein the received data is processed using an artificial neural network (ANN), the ANN comprises a neuron model used for processing the data, and the computing device provides the data from processing sensor data obtained from at least one sensing device of a vehicle, wherein the sensor data corresponds to an image collected by an image sensor of the vehicle;
   send, to the computing device, a first portion of the neuron model, wherein the first portion is selected based on predicted data traffic associated with processing the sensor data, the predicted data traffic including at least one of data traffic to the computing device, or data traffic from the computing device;
   receive, from the computing device, an intermediate result, wherein the computing device provides the intermediate result based on processing the sensor data using the first portion, wherein the intermediate result comprises at least one of an identification of an object in the image, or a classification of the object; and
   provide, by processing the intermediate result using a second portion of the neuron model, an output.

2. The system of claim 1, wherein selecting the first portion of the neuron model based on predicted data traffic comprises selecting a set of neurons from the neuron model, and wherein selecting the set of neurons is based on at least one of comparing a data size of input data to be processed using the first portion to a data size of output data to be obtained from processing using the first portion, or comparing a data size of input data to be processed using the first portion to a data size of the first portion.

3. The system of claim 1, wherein the instructions are further configured to instruct the at least one processing device to:
   predict, using at least a portion of the ANN, that the data size of the sensor data processed using the first portion is greater than the data size of the first portion;
   wherein the first portion is sent to the computing device in response to the predicting that the data size of the sensor data processed using the first portion is greater than the data size of the first portion.

4. A method comprising:
   processing, by a first computing device and using an artificial neural network (ANN), data received over a network from a second computing device, wherein the ANN comprises a neuron model used for processing the data, the second computing device processes sensor data from at least one sensing device of a vehicle, and the second computing device provides the received data from processing the sensor data, wherein the sensor data corresponds to an image collected by an image sensor of the vehicle;
   determining, by the first computing device, to perform processing for a first portion of the neuron model on the second computing device;
   in response to determining to perform processing for the first portion of the neuron model on the second computing device, sending the first portion over the network to the second computing device, wherein the second computing device provides an intermediate result based on processing the sensor data using the first portion, wherein the intermediate result comprises at least one of an identification of an object in the image, or a classification of the object;
   receiving, from the second computing device, the intermediate result; and
   processing, by the first computing device, the intermediate result using a second portion of the neuron model to provide an output.

5. The method of claim 4, wherein the first computing device is a first server, and the second computing device is a second server on a communication path between the vehicle and the first server.

6. The method of claim 5, wherein the determining to perform the processing for the first portion on the second computing device comprises at least one of comparing a data size of the sensor data to a data size of the intermediate result, comparing a data size of the sensor data to a data size of the first portion, or comparing a data size of the intermediate result to a data size of the first portion.

7. The method of claim 6, wherein the sensor data is an first input vector, and the intermediate result is a first output vector.

8. The method of claim 7, wherein the determining to perform the processing for the first portion of the neuron model on the second computing device further comprises predicting at least one of the data size of the first input vector, or the data size of the first output vector.

9. The method of claim 4, wherein the determining to perform the processing for the first portion on the second computing device is based on determining whether the sensor data will be uploaded to the first computing device after the intermediate result is provided.

10. The method of claim 4, wherein the at least one sensing device comprises an image sensor.

11. The method of claim 4, further comprising:

determining, by the first computing device, to perform processing for a third portion of the ANN on the vehicle; and in response to determining to perform processing for the third portion on the vehicle, sending the third portion over a network to the at least one sensing device, wherein:

the at least one sensing device generates the sensor data using the third portion to process at least one image from an image sensor; and the at least one sensing device sends the generated sensor data to the second computing device for use in determining the intermediate result.

12. The method of claim 4, further comprising sending, to the vehicle, the output to control an action on the vehicle.

13. The method of claim 4, wherein the second computing device is a controller in a computer system of the vehicle.

14. The method of claim 4, wherein the determining to perform the processing for the first portion of the neuron model on the second computing device comprises evaluating data traffic between the first computing device and the second computing device that is associated with providing the output.

15. The method of claim 14, wherein the data traffic is associated with at least one of receiving the sensor data from the second computing device after determining that the sensor data requires further processing by the ANN at the first computing device, sending the first portion to the second computing device, or receiving the intermediate result from the second computing device.

16. The method of claim 4, further comprising selecting the first portion of the neuron model for sending to the second computing device, wherein the selecting is based on predicted data traffic between the first computing device and the second computing device.

17. A system comprising:
at least one processing device; and
memory containing instructions configured to instruct the at least one processing device to:

process, using at least one portion of an artificial neural network (ANN), sensor data obtained from at least one sensing device of a vehicle;

send, over a network to a computing device, results from processing the sensor data, wherein the sensor data corresponds to an image collected by an image sensor of the vehicle;

receive, from the computing device, a first portion of the ANN, the first portion selected based on a prediction of data traffic associated with processing the sensor data, the predicted data traffic including at least one of data traffic to the computing device, or data traffic from the computing device; and send, to the computing device, an intermediate result determined based on processing the sensor data using the first portion, wherein the computing device provides an output used to control the vehicle, and the output is obtained by processing the intermediate result using a second portion of the ANN and wherein the intermediate result comprises at least one of an identification of an object in the image, or a classification of the object.

18. The system of claim 17, wherein the instructions are further configured to instruct the at least one processing device to:

compare a data size of the sensor data to a data size of the first portion of the ANN; and send, to the computing device and based on the comparing the data size of the sensor data to the data size of the first portion, a request for the first portion;

wherein the first portion is received from the computing device in response to the request.

19. The system of claim 17, wherein the first portion is selected to reduce predicted data traffic to and from the computing device when processing the sensor data using the ANN.

* * * * *